(12) United States Patent
Munyon et al.

(10) Patent No.: US 9,330,246 B2
(45) Date of Patent: May 3, 2016

(54) SYSTEM AND METHOD FOR INHIBITING ACCESS TO A COMPUTER

(76) Inventors: Paul J. Munyon, Arlington, VA (US); Gay L. Munyon, Arlington, VA (US)

(*) Notice: Subject to any disclaimer, the term of this patent is extended or adjusted under 35 U.S.C. 154(b) by 808 days.

(21) Appl. No.: 12/924,558

(22) Filed: Sep. 29, 2010

(65) Prior Publication Data

US 2011/0023113 A1    Jan. 27, 2011

Related U.S. Application Data

(63) Continuation-in-part of application No. 11/269,996, filed on Nov. 9, 2005, now abandoned.

(51) Int. Cl.
*H04L 29/06* (2006.01)
*G06F 21/32* (2013.01)
*G06F 21/35* (2013.01)

(52) U.S. Cl.
CPC .............. *G06F 21/32* (2013.01); *G06F 21/35* (2013.01); *G06F 2221/2139* (2013.01)

(58) Field of Classification Search
CPC .. G06F 21/32; G06F 21/35; G06F 2221/2139
USPC ............................................. 726/22; 713/186
See application file for complete search history.

(56) References Cited

U.S. PATENT DOCUMENTS

| | | | | | |
|---|---|---|---|---|---|
| 4,932,050 A | * | 6/1990 | Davidson | ................ | H04M 1/82 379/201.01 |
| 5,629,984 A | * | 5/1997 | McManis | ............... | G06F 1/1616 345/629 |
| 5,712,973 A | * | 1/1998 | Dayan | ..................... | G06F 21/35 380/258 |
| 5,925,128 A | * | 7/1999 | Harmon | .................... | G06F 1/26 713/320 |
| 5,960,084 A | * | 9/1999 | Angelo | ................... | G06F 21/34 235/380 |
| 6,041,413 A | * | 3/2000 | Wang | ........................ | G06F 1/26 713/300 |
| 6,202,161 B1 | * | 3/2001 | Wang | ........................ | G06F 1/26 713/300 |
| 6,298,447 B1 | * | 10/2001 | Wang | ...................... | G06F 21/31 713/300 |
| 6,338,142 B1 | * | 1/2002 | Alsaadi | ................... | G06F 21/81 713/320 |
| 6,374,145 B1 | * | 4/2002 | Lignoul | .................. | G06F 21/84 700/17 |
| 6,516,421 B1 | * | 2/2003 | Peters | ................. | H04W 52/027 713/320 |
| 6,650,306 B2 | * | 11/2003 | Yerazunis | ............... | G06F 21/84 345/7 |
| 6,665,805 B1 | * | 12/2003 | Tsirkel | ................... | G06F 1/3203 713/310 |
| 6,714,665 B1 | * | 3/2004 | Hanna | ...................... | G06K 9/00 382/106 |
| 6,802,016 B2 | * | 10/2004 | Liu | ......................... | G06F 1/3203 340/686.6 |
| 6,823,459 B1 | * | 11/2004 | Horikoshi | ............... | G06F 21/35 713/300 |
| 6,947,894 B1 | * | 9/2005 | Engstrom | ............. | G06F 1/3203 704/233 |
| 6,972,677 B2 | * | 12/2005 | Coulthard | .............. | G06Q 50/22 340/531 |
| 7,010,710 B2 | * | 3/2006 | Piazza | ................... | G06F 1/3231 713/323 |

(Continued)

*Primary Examiner* — David Garcia Cervetti
(74) *Attorney, Agent, or Firm* — J. Wiley Horton

(57) ABSTRACT

A computer security system which prevents an unauthorized user from accessing the computer system when an authorized user has already logged onto the computer system and has temporarily left the workstation. The computer security system generally includes a sensor which is configured to detect the presence of a person in the region around a workstation and a processing unit which logs out of the computer when a person is no longer present in the region. An optional calibration tool may be provided to set the sensitivity of the sensor and prevent accidental logging out when the authorized user is still present in the region around the workstation.

18 Claims, 5 Drawing Sheets

(56) References Cited

U.S. PATENT DOCUMENTS

| | | | | |
|---|---|---|---|---|
| 7,089,508 | B1* | 8/2006 | Wright | G06F 9/45512 713/300 |
| 7,100,203 | B1* | 8/2006 | Tosey | G06F 21/31 713/167 |
| 7,108,177 | B2* | 9/2006 | Brookner | G06F 21/35 235/380 |
| 7,111,781 | B2* | 9/2006 | Fletcher | G11C 15/6895 235/383 |
| 7,117,068 | B2* | 10/2006 | Critchlow | B25J 9/1692 235/383 |
| 7,117,380 | B2* | 10/2006 | Kangas | G06F 1/3203 713/310 |
| 7,152,172 | B2* | 12/2006 | Tsirkel | G06F 1/3203 713/310 |
| 7,184,025 | B2* | 2/2007 | Williams | G06F 1/1626 345/169 |
| 7,185,281 | B2* | 2/2007 | Farago | G01D 4/002 702/188 |
| 7,237,024 | B2* | 6/2007 | Toomey | H04L 63/108 709/224 |
| 7,242,421 | B2* | 7/2007 | Center, Jr. | H04N 21/44218 348/14.1 |
| 7,249,024 | B2* | 7/2007 | Engstrom | G06F 1/3203 704/270 |
| 7,289,102 | B2* | 10/2007 | Hinckley | G06F 1/1626 345/156 |
| 7,290,278 | B2* | 10/2007 | Cahill | G06Q 20/0855 705/64 |
| 7,302,280 | B2* | 11/2007 | Hinckley | G06F 1/1626 455/567 |
| 7,346,933 | B2* | 3/2008 | Gliniecki | G06F 21/35 340/287 |
| 7,360,161 | B2* | 4/2008 | Cina | G06Q 10/00 713/300 |
| 7,400,878 | B2* | 7/2008 | Hassan | G06F 21/31 455/410 |
| 7,437,765 | B2* | 10/2008 | Elms | G06F 21/83 345/615 |
| 2002/0095222 | A1* | 7/2002 | Lignoul | G06F 21/35 700/13 |
| 2002/0136435 | A1* | 9/2002 | Prokoski | G06K 9/00221 382/118 |
| 2003/0007077 | A1* | 1/2003 | Maggi | H04N 17/002 348/223.1 |
| 2003/0074575 | A1* | 4/2003 | Hoberock | G06F 21/35 726/34 |
| 2003/0197779 | A1* | 10/2003 | Zhang | H04N 7/144 348/14.16 |
| 2003/0218672 | A1* | 11/2003 | Zhang | H04N 7/15 348/14.16 |
| 2004/0109063 | A1* | 6/2004 | Kusaka | H04N 1/00244 348/207.1 |
| 2004/0148518 | A1* | 7/2004 | Grundback | G08B 29/188 713/153 |
| 2005/0210270 | A1* | 9/2005 | Rohatgi | G06F 21/32 713/186 |
| 2005/0270386 | A1* | 12/2005 | Saitoh | G06K 9/00604 348/239 |
| 2006/0050933 | A1* | 3/2006 | Adam | G06K 9/00221 382/118 |
| 2006/0053459 | A1* | 3/2006 | Simerly | G08B 13/19604 725/105 |
| 2006/0082438 | A1* | 4/2006 | Bazakos | G06K 9/00255 340/5.82 |
| 2006/0082439 | A1* | 4/2006 | Bazakos | G06K 9/00228 340/5.82 |
| 2006/0102843 | A1* | 5/2006 | Bazakos | G06K 9/00255 250/339.05 |
| 2006/0104488 | A1* | 5/2006 | Bazakos | G06K 9/00255 382/118 |
| 2006/0143470 | A1* | 6/2006 | Igarashi | G07C 9/00158 713/186 |
| 2006/0282671 | A1* | 12/2006 | Burton | G06F 21/32 713/176 |
| 2006/0288234 | A1* | 12/2006 | Azar | G06F 21/32 713/186 |
| 2007/0014431 | A1* | 1/2007 | Hammoud | G06K 9/00604 382/103 |
| 2007/0083915 | A1* | 4/2007 | Janakiraman | G06F 21/316 726/4 |
| 2008/0128495 | A1* | 6/2008 | Weintraub | G06F 3/044 235/382 |
| 2008/0212849 | A1* | 9/2008 | Gao | G06K 9/00255 382/118 |
| 2008/0309801 | A1* | 12/2008 | Cuccias | H04N 5/2254 348/242 |
| 2011/0299741 | A1* | 12/2011 | Zhang | G06K 9/00906 382/117 |

\* cited by examiner

SYSTEM AND METHOD FOR INHIBITING ACCESS TO A COMPUTER

CROSS-REFERENCES TO RELATED APPLICATIONS

This application is a continuation-in-part of U.S. application Ser. No. 11/269,996. The parent application was filed on Nov. 9, 2005, and is now abandoned. The parent application listed the same inventors.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of computer security. More specifically, the present invention comprises a method for continuously monitoring for the presence of a specific authorized user or users and—if the presence of an authorized user is no longer detected—terminating access to the computer.

2. Description of the Related Art

Various devices exist for preventing the unauthorized access of computers. Most of these devices are directed to lockout mechanisms which prevent an unauthorized user from logging onto a computer.

For example, U.S. Pat. No. 5,960,084 to Angelo describes a method of enabling power to a computer system based upon the results of a two-piece user verification procedure. If the user does not provide the required "smart card" and password, power to the computer system is disabled.

Another example is U.S. Pat. No. 6,338,142 to Alsaadi. Alsaadi's patent discloses a lockout circuit which generates an interfering signal that disrupts the "power on" signal generated by the computer's power controller. The lockout circuit generates this interfering signal when triggered by a triggering device such as an Ethernet chip or a switch.

Yet another example is provided in U.S. Pat. No. 5,712,973 to Dayan et al. Dayan et al.'s patent discloses a security feature which renders a computer system inoperable when an unauthorized user moves the system out of a containment region. To accomplish this, Dayan et al. uses a radiation source, such as a radio frequency transmitter, to transmit radiation with particular characteristics throughout the containment zone. Logic circuitry is provided as part of the system to disable access when the radiation is no longer detected.

Another approach is to use monitoring technology to monitor for the presence of a person near the computer (such as through the use of a motion detector). When such systems determine that no person is present near the computer, the systems log the current user out of the computer. Many other devices are also known in the art. Like the aforementioned security systems, however, none of these devices seek to monitor whether a specific authorized user is still present. The current inventive method remedies this and other deficiencies.

BRIEF SUMMARY OF THE INVENTION

The present invention comprises a computer security system which monitors for the continued presence of a specific authorized individual or individuals. If the system fails to detect the continued presence of the authorized user, then it logs that user out of the system and may optionally log all users out of the system.

The system uses recognition technology such as infrared emission signatures or facial topography. A database of one or more users is created, with the database correlating each specific user against predetermined recognition data. When a particular user logs in the system knows what recognition data it should receive. A calibration step may optionally be performed to account for variations in the recognition data. Once a user is logged in, the system continuously monitors for the presence of recognition data corresponding to the particular user that has logged in. If the system fails to detect the proper recognition data for a defined interval of time, then it logs the user out.

REFERENCE NUMERALS IN THE DRAWINGS

| 10 | computer security system | 12 | computer |
|----|---|----|---|
| 14 | monitor | 16 | sensor |
| 18 | cord | 20 | sensor signal transmitter |
| 22 | A/D converter | 24 | sensor/CPU interface |
| 26 | central processing unit | 28 | memory |
| 30 | program | 32 | calibration tool |
| 34 | sensor input | 36 | signal sampler |
| 38 | comparator | 40 | signal criteria |
| 42 | calibration tool | 44 | command |
| 46 | logoff module | 48 | outline data |
| 50 | chin parameter | 52 | nose tip parameter |
| 54 | right eye parameter | 56 | left eye parameter |
| 58 | pate IR return | 60 | cheek bone IR return |
| 62 | nose tip IR return | 64 | chin IR return |

DETAILED DESCRIPTION OF THE INVENTION

Figure 1:
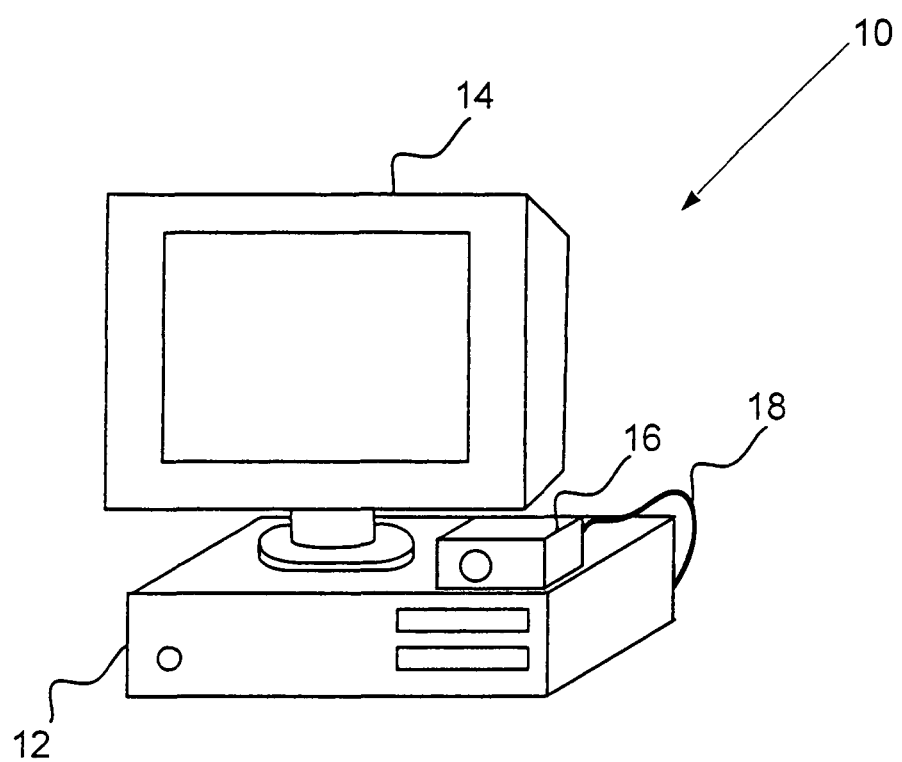
FIG. 1 is a perspective view, showing the present invention.

The present invention controls the security of a computer system. Computer security system 10 is shown in FIG. 1. Suitable recognition technology is used to specifically identify authorized users. Computer security system 10 may be employed in any setting where one wishes to limit access.

As shown in FIG. 1, computer security system 10 includes sensor 16 which is plugged into computer 12 with cord 18. Cord 18 preferably serves as a conduit for power and data transfer. Cord 18 may be a Universal Serial Bus ("USB") adapted cord or any other cord which will support data transfer between sensor 16 and computer 12. In addition, a separate power cord may also be provided to sensor 16 with its own transformer and wall plug. Computer 12 is also provided with monitor 14. Although a desktop-type computer is shown in FIG. 1, the invention may also be employed on a laptop computer. If a laptop is used, sensor 16 may either be external to the laptop or internally integrated.

Sensor 16 may be any type of sensing means that is configured to detect unique identifying characteristics of a particular individual. As an example, the sensor may be a digital camera which records an image of an individual sitting in front of monitor 14. This image is then sent to computer 12. The method carried out in the present invention is preferably implemented in software running on the computer being controlled (though it could optionally use software running on a separate device).

The security system includes access to a database of authorized users. The unique identifying characteristics of the authorized users are preferably contained within the same database.

Figure 2:
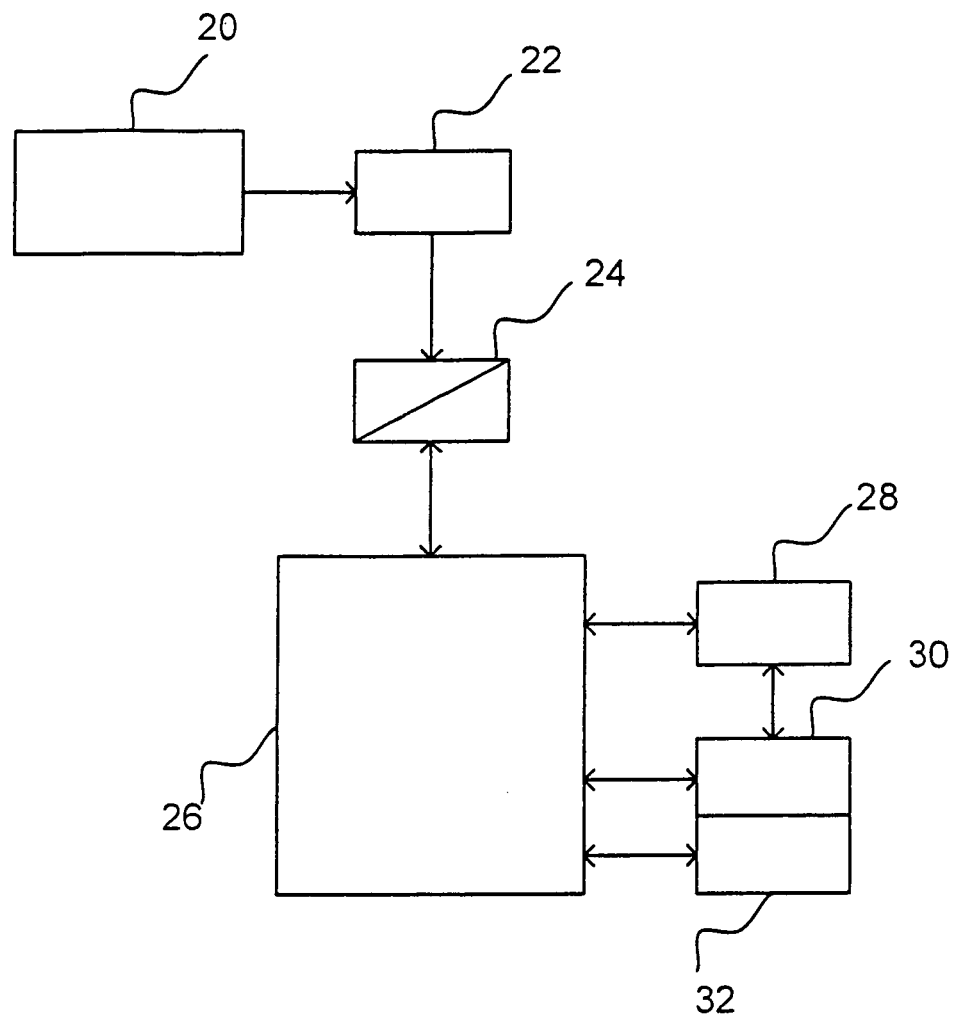
FIG. 2 is a schematic, showing the present invention.

A schematic of an electronic circuit incorporating the present invention is provided in FIG. 2. Sensor signal transmitter 20 transmits sensory data from sensor 16 to the electronic circuit. The type of sensory data transmitted by sensor signal transmitter 20 depends on the type of sensor that is used. If a thermal sensor is utilized, thermal imagery data may be transmitted by sensor signal transmitter 20.

Sensor signal transmitter 20 may transmit the sensory data to A/D converter 22 to convert the signal representing the sensory data from analog to digital format. Obviously, A/D converter 22 is not necessary if the sensor normally transmits in digital format. A/D converter 22 may be integrated with sensor 16 so that they are packaged together in one unit.

A/D converter 22 transmits the sensory data to sensor CPU interface 24. The sensory data may be any type of data that may be used to confirm the presence or absence of a particular user. For example, the sensory data may be a pixelated digital image which facial recognition software then analyzes to determine the facial topography of the individual presently seated before the computer. In the preferred embodiment sensor/CPU interface 24 is a USB port, but other computer ports may similarly be used. Central processing unit 26 interfaces with sensor 16 through sensor/CPU interface 24. Central processing unit 26 is a processing means which is configured to process the sensory data and determine whether a person is present in the region around the workstation. Central processing unit 26 may be the central processing unit associated with the computer or it may be a standalone or computer-implanted processing device.

Central processing unit 26 is associated with memory 28. Memory 28 may be any type of memory unit that may be read by central processing unit 26 including RAM, ROM, computer readable disk, and other external storage devices. Memory 28 stores program 30 and calibration tool 32. Memory 28 may also service central processing unit 26's short-term memory needs. Program 30 is a computer program which includes a program module for directing central processing unit 26 in making a determination of whether a person sitting in front of the workstation is an authorized user. Calibration tool 32 includes a calibration module for calibrating program 30 with sensor 16 and the default state of the region around the workstation as will be described subsequently. It also may include a module for setting a sensitivity threshold for the sensor.

Figure 3:
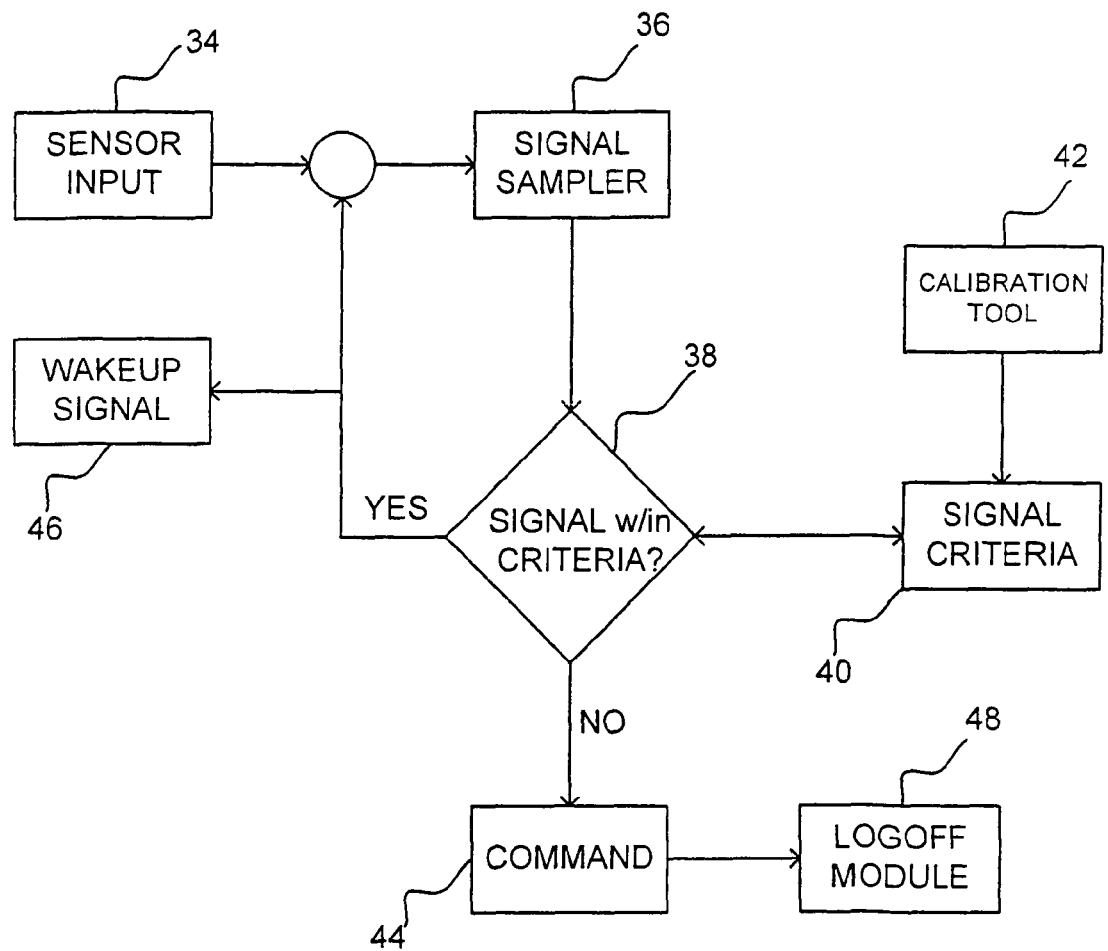
FIG. 3 is a diagram, showing the present invention.

An information flow diagram illustrating the relationship between the various components of the present invention is provided in FIG. 3. Sensor input 34 represents the flow of sensory data to central processing unit 26. Sensory data is transmitted from sensor input 34 to signal sampler 36. Signal sampler 36 is a section of the program module which samples the sensory data for specific characteristics. Comparator 38 compares the sampled sensory data signal with stored sensory data describing the specific individual who is presently logged into the workstation.

Calibration tool 42 represents the calibration module that may be used to calibrate the sensor and program module with a "default state" for a particular authorized user. If comparator 38 receives information from the signal sampler corresponding to the data stored for the authorized user (signal criteria 40) that is presently logged into the workstation, then it sends a "NO" command to logoff module 48 and the computer system remains active. If, however, comparator 38 receives information that is inconsistent with the data stored for the present user, then a "YES" command is sent and logoff module 48 automatically logs the user out of the system. The logoff module may be set to log all users out of the system at that point (if multiple users are logged into the single workstation).

A time interval may be set for the signal sampler and a time interval may be set for the logoff module. As an example, sample data could be collected once for every five seconds of operation. The logoff module could be set to only log the authorized user off the system if no consistent data was received for 10 samples (a 50 second interval).

The inventive method is not limited to any particular sensing technology, so long as the technology is capable of accurately detecting characteristics which uniquely define a particular authorized user. Some examples may be helpful, however, in understanding how the invention works.

Figure 4:
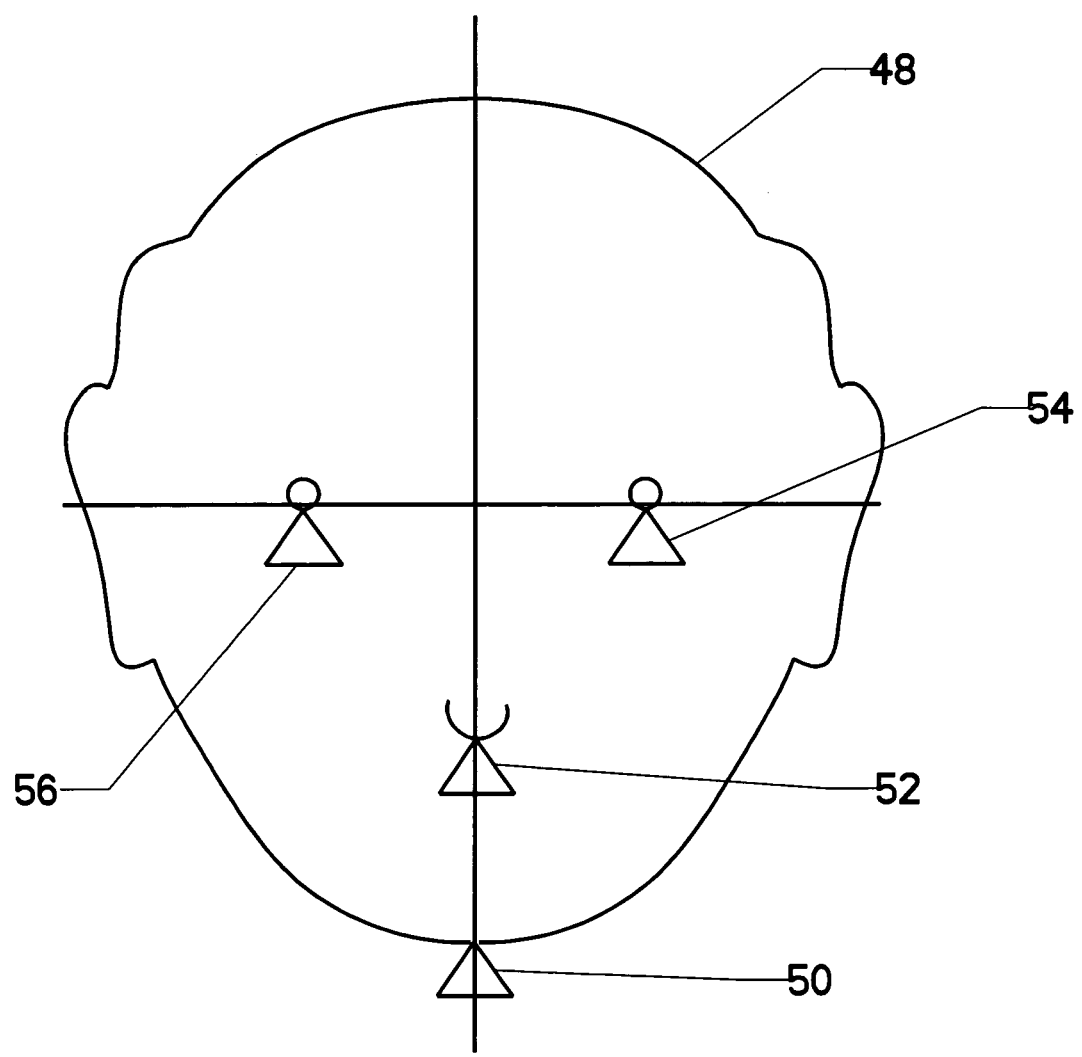
FIG. 4 is an elevation view, showing representative facial topography data.

In a first example, the sensor employed is a digital camera. An image from this camera is sent to central processing unit 26 at predetermined intervals. Facial recognition software is then used to analyze the topography of the face of the person sitting in front of the workstation. FIG. 4 shows a somewhat simplified depiction of the operation of this software.

The software recognizes that a user's head will move and turn. Most facial recognition software works best when the sensor is directly pointed at the user's face. The software analyzes the image data and defines an outline for the face denoted as outline data 48. The software also locates a right eye parameter 54, a left eye parameter 56, a nose tip parameter 52, and a chin parameter 50. These parameters define the dimensions of the user's face.

The user database compares values for all these parameters which have previously been recorded and referenced for a particular authorized user. These values are compared against the values that the sensor currently "sees" in order to determine whether the individual sitting at the computer corresponds to the expected values for these parameters. If the parameters do not correspond, then the user will be logged off automatically.

Those skilled in the art will know that a user will not hold his head steady and look continuously toward the sensor. The user's head will be in motion continuously. The facial recognition software accommodates these facts by reviewing many samples in any given time period and analyzing them. It is able to detect when a planar view of the face is available and perform the comparison on the basis of that image.

One optional feature is to provide a user query function where the computer actually requests the user to look directly at the sensor and hold still for a verification analysis. Thus, the system can avoid undesired log offs by requiring the user to verify his identity. Facial recognition software is now very fast, so the verification process would not be overly disruptive.

Figure 5:
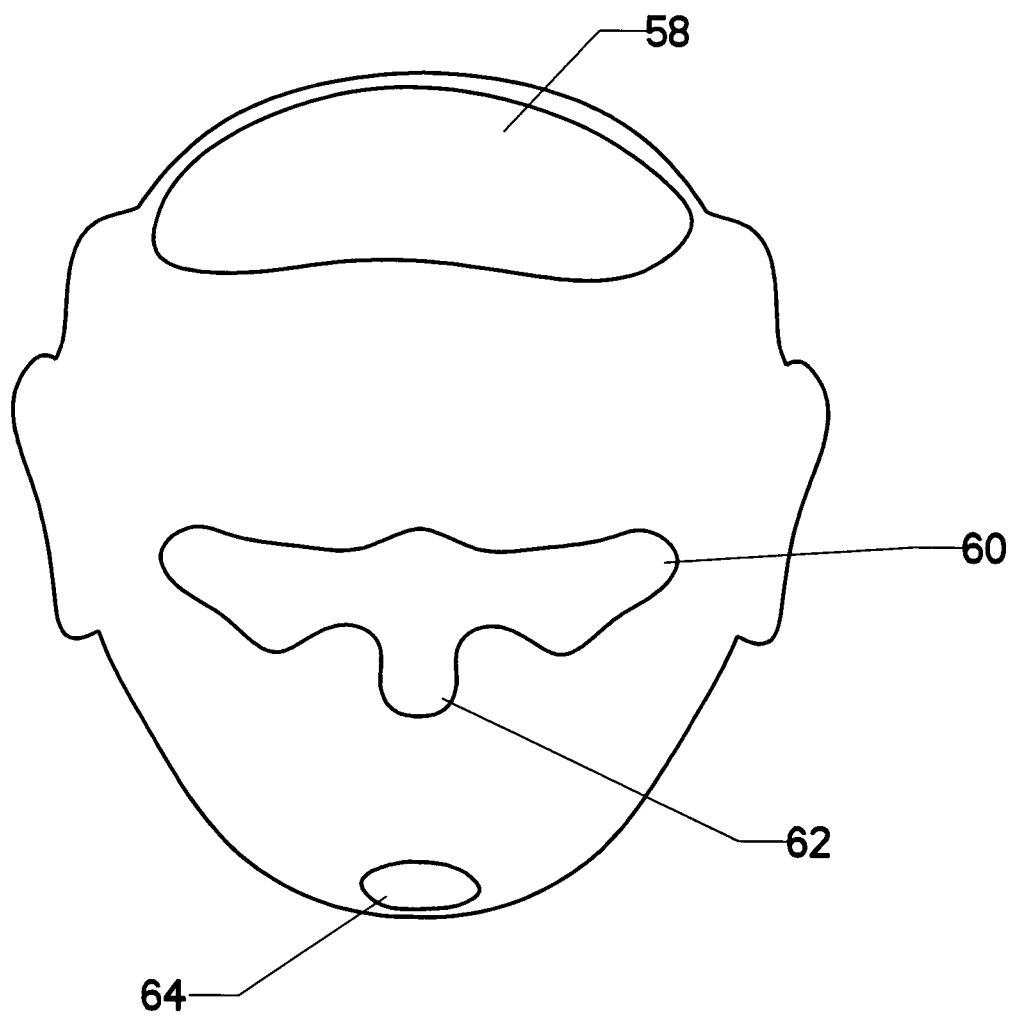
FIG. 5 is an elevation view, showing representative infrared data.

FIG. 5 shows a second approach to identifying the characteristics of a specific authorized user. An infrared emitter is employed. This can be an existing passive device, such as an overhead light. It can also be an active, controlled device. It is advantageous to use a controlled device since it can be positioned to provide highly unique signatures for each individual. However, simply using existing lighting and heat sources will work in many instances.

In FIG. 5 an overhead infrared source shines down upon the user's head. The sensor is an infrared sensor. It detects various regions of infrared reflectivity. These include pate IR return 58, cheek bone IR return 60, nose tip IR return 62, and chin IR return 64.

The regions of reflectivity tend to be unique from individual to individual. For instance, the user shown in FIG. 5 is bald. This produces a higher pate IR return 58 than for an individual with hair.

Of course, it is possible to use multiple sensing technologies. The information from the digital camera shown in FIG. 4 can be combined with the infrared information from FIG. 5. The system may then be selectively configured to require the information from both sensing techniques to match.

Whatever sensing technology is used, the inventive method must have historical data against which to compare and check the identity of the present user. There are many ways to obtain the historical data. The simplest one is to establish it at the start of every log on. When an authorized user enters his or her password, the system will prompt the user to remain still for a few seconds and look straight into the computer monitor. The sensing technology then records the data at that point to create the reference profile for that user. It then monitors what is observed as the user continues using the system and logs the user out if it no longer "sees" a match. An advantage of this approach is that it easily accounts for day to day changes. As an example, a user growing her hair to a longer length will cause her recognition data to change. Because the system creates a new set of baseline recognition data during each log on, this will not pose a problem.

Of course, one weakness in this system is the fact that if the password is compromised an unauthorized user can provide his or her own recognition data during the log on, and that incorrect data will remain associated with the user definition. One way around this issue is to require a more formal process for creating the baseline data. One could require the presence of a security officer who is also logged into the system prior to acceptance of the baseline data. One could also require that the baseline data be created in a separate location with additional security.

Calibration tool 42 (as referenced in FIG. 3) may provide other desired features, particularly if a dedicated location is used for creating baseline data. As one example, the system can control a light source behind the user's position. This light source would be turned on to create a "backlit" configuration making it easier to establish outline data 48 shown in FIG. 4. All the data will be stored as signal criteria 40 (FIG. 3).

The calibration system may also include predictive algorithms it can use to analyze which recognition data changes would be expected in day to day variations as opposed to which changes might represent an attempt to defeat the system.

It is preferable to provide a configurable system wherein the response to the detection of an anomaly can be handled in a way a particular administrator chooses. As an example, some users may be concerned that the automatic log off feature will be disruptive to work flow. The system could be configured so that when the comparator detects a likely instance of the authorized user no longer being present at the workstation, it sends a signal to a designated security administrator. This individual can then review the image data (preferably remotely) in order to see whether the authorized user has indeed left the station or whether—instead—there is a system error. This feature would also allow the security administrator to take appropriate action if the authorized user has indeed left the workstation without logging off.

Other administrators may elect to have the system operate automatically. An activity log can be recorded in the database so that the administrator can review the events surrounding an automatic log off. Of course, the administrator is preferably able to set many other parameters, including (1) the sample rate for the sensing system; (2) a time delay between the detection of an anomaly and an automatic log off; (3) the action taken upon the detection of an anomaly; and (4) data recording of events.

The administrator is preferably also able to set the amount of divergence between the measured parameters and the user definition in the database required to trigger an anomaly. This will likely be dependant on the type of sensor that is used as well as the habits of the user and the characteristics of the region around the user's workstation. The administrator may even wish to set different divergence thresholds for different users.

The system may employ simpler detection methods in combination with the individual recognition data—such as a motion detector. If no motion is detected for a defined period of time, the system can be set to log the user off. As an example, a system using facial recognition software might only require a "match" to be made once per minute. Yet, the system might be set to perform an automatic log off if no motion at all is detected for a period of 30 seconds.

The preceding description contains significant detail regarding the novel aspects of the present invention. It should not be construed, however, as limiting the scope of the invention but rather as providing illustrations of the preferred embodiments of the invention. As an example, the aforementioned security system may block access in many ways other than logging out of the user's account, including limiting the display of screens, specific data or programs, as well as preventing the copying and writing of files. In addition, access may also be blocked without actually closing programs. The specific implementation of the security may vary based on the user's needs. Also, other sensors which relay sensory information may be used than the examples provided in the preceding description. For example, pressure sensitive pads may be used on or under the user's chair to detect the presence of the user. Such variations would not alter the function of the invention. Thus, the scope of the invention should be fixed by the following claims, rather than by the examples given.

Having described our invention, we claim:

1. A method for ensuring that only an authorized user remains logged into a computer system, comprising:
   a. providing a central processing unit;
   b. providing a memory connected to said central processing unit;
   c. providing a digital camera capable of identifying unique characteristics of said authorized user, said digital camera being connected to said central processing unit;
   d. establishing a set of unique identifying characteristics of said authorized user and storing said unique identifying characteristics in said memory, along with a reference to the authorized user to which they pertain;
   e. said unique identifying characteristics being identifiable from an output of said digital camera alone;
   f. after said authorized user logs into said computer system, using said central processing unit to compare information from said digital camera against said unique identifying characteristics in said memory corresponding to said authorized user;
   g. upon failing to detect a match between said information from said digital camera and said set of unique identifying characteristics in said memory for a defined interval, sending a signal to a security administrator, along with said information from said digital camera;
h. presenting said information from said digital camera to said security administrator;
i. allowing said security administrator to declare said detected mismatch a system error and prevent the logging off of said authorized user; and
j. upon failing to detect said match for said defined interval and failing to receive said declaration of system error from said security administrator, logging off said authorized user.

2. A method for ensuring that only an authorized user remains logged into a computer as recited in claim 1, further comprising:
a. providing an infrared emitter above said user and directed downward toward said user,
b. wherein said digital camera is able to detect reflections from said infrared emitter off said user; and
c. wherein said set of unique identifying characteristics for said user includes a pate infra red return, a cheek bone infra red return, and a nose tip infra red return.

3. A Method for ensuring that only an authorized user remains logged into a computer as recited in claim 1, wherein said unique identifying characteristics of said authorized user include facial topography.

4. A method for ensuring that only an authorized user remains logged into a computer as recited in claim 1, wherein said step of establishing a set of unique identifying characteristics of said authorized user occurs at the time said authorized user logs on.

5. A method for ensuring that only an authorized user remains logged into a computer as recited in claim 1, wherein:
a. said step of establishing a set of unique identifying characteristics of said authorized user occurs before the time said authorized user logs on and
b. said step of establishing a set of unique identifying characteristics of said authorized user is only possible when a designated security officer has logged into said computer system in addition to said user.

6. A method for ensuring that only an authorized user remains logged into a computer as recited in claim 1, wherein:
a. said step of establishing a set of unique identifying characteristics of said authorized user occurs before the time said authorized user logs on;
b. upon failing to detect a match between said information from said digital camera and said set of unique identifying characteristics in said memory for a defined interval, and before logging off said authorized user, having said computer system instruct said user to look directly at said digital camera and remain still; and
c. again performing said step of comparing information from said digital camera against said unique identifying characteristics in said memory corresponding to said authorized user and only logging off said user if a match is not found during this second comparison.

7. A method for ensuring that only an authorized user remains logged into a computer as recited in claim 1, wherein said result of said comparison performed by said central processing, unit is stored in said memory.

8. A method for ensuring that only an authorized user remains logged into a computer as recited in claim 1, wherein said information from said digital camera is stored in said memory.

9. A method for ensuring that only an authorized user remains logged into a computer as recited in claim 8, wherein said result of said comparison performed by said central processing unit is stored in said memory.

10. A method for ensuring that only an authorized user remains logged into a computer system, comprising:
a. providing a central processing unit;
b. providing a memory connected to said central processing unit;
c. providing a digital camera capable of identifying unique characteristics of said authorized user, said digital camera being connected to said central processing unit;
d. storing a set of digital camera output data corresponding to said authorized user in said memory;
e. said unique identifying characteristics being identifiable from an output of said digital camera alone;
f. after said authorized user logs into said computer system, using said central processing unit to compare information from said digital camera against said set of digital camera output data corresponding to said authorized user stored in said memory;
g. upon failing to detect a match between said digital camera data and said unique identifying characteristics in said memory for a defined interval, taking a predetermined action;
h. said step of establishing a set of unique identifying characteristics of said authorized user occurs before the time said authorized user logs on;
i. upon failing to detect a match between said sensor data and said data in said memory for a defined interval, and before taking said predetermined action, having said computer system instruct said user to look directly at said digital camera and remain still; and
j. again performing said step of comparing information from said digital camera against said unique identifying characteristics in said memory corresponding to said authorized user and only taking said predetermined action if a match is not found during this second comparison.

11. A method for ensuring that only an authorized user remains logged into a computer as recited in claim 10, wherein said predetermined action is selected from the group consisting of logging off said authorized user and notifying a security administration officer.

12. A method for ensuring that only an authorized user remains logged into a computer as recited in claim 10, further comprising:
a. providing a security administrator who is located remotely from said user;
b. upon failing to detect a match between said digital camera data and said unique identifying characteristics in said memory sending a signal to said security administrator; and
c. upon failing to detect a match between said digital camera data and said unique identifying characteristics in said memory, sending said output of said digital camera to said security administrator.

13. A method for ensuring that only an authorized user remains logged into a computer as recited in claim 10, further comprising:
a. providing an infrared emitter above said user and directed downward toward said user;
b. wherein said digital camera is able to detect reflections from said infrared emitter oft said user; and
c. wherein said set of unique identifying characteristics for said user includes a pate infra red return, a cheek bone infra red return, and a nose tip infra red return.

14. A method for ensuring that only an authorized user remains logged into a computer as recited in claim 10, wherein said unique identifying characteristics of said authorized user include facial topography.

15. A method for ensuring that only an authorized user remains logged into a computer as recited in claim 10, wherein said step of establishing a set of unique identifying characteristics of said authorized user occurs at the time said authorized user logs on.

16. A method for ensuring that only an authorized user remains logged into a computer as recited in claim 10 wherein:
   a. said step of establishing a set of unique identifying characteristics of said authorized use occurs before the time said authorized user logs on; and
   b. said step of establishing a set of unique identifying characteristics of said authorized user is only possible when a designated security officer has logged into said computer system in addition to said user.

17. A method for ensuring that only an authorized user remains logged into a computer as recited in claim 10, wherein said result of said comparison performed by said central processing unit is stored in said memory.

18. A method for ensuring that only an authorized user remains logged into a computer as recited in claim 10, wherein said information from said digital camera is stored in said memory.

\* \* \* \* \*